United States Patent [19]
Brown et al.

[11] Patent Number: 5,875,446
[45] Date of Patent: Feb. 23, 1999

[54] SYSTEM AND METHOD FOR HIERARCHICALLY GROUPING AND RANKING A SET OF OBJECTS IN A QUERY CONTEXT BASED ON ONE OR MORE RELATIONSHIPS

[75] Inventors: Eric William Brown, New Fairfield, Conn.; Rong Nickle Chang, Ossining; Hamed Abdelfattah Ellozy, Bedford Hills, both of N.Y.; John Martin Prager, Hackensack, N.J.; Edward Cholchin So, Flushing, N.Y.

[73] Assignee: International Business Machines Corporation, Armonk, N.Y.

[21] Appl. No.: 804,599

[22] Filed: Feb. 24, 1997

[51] Int. Cl.6 ........................................ G06F 17/30
[52] U.S. Cl. ................ 707/3; 707/1; 707/4; 707/103; 707/104
[58] Field of Search ............................ 395/200.79, 683, 395/703, 708, 200.75; 707/203, 1, 3, 4, 103, 104; 380/4; 345/348, 356; 706/5, 25; 434/350; 370/351, 222; 379/202

[56] References Cited

U.S. PATENT DOCUMENTS

| | | | |
|---|---|---|---|
| 5,371,852 | 12/1994 | Attanasio | 395/200.75 |
| 5,491,820 | 2/1996 | Belove | 707/3 |
| 5,680,452 | 10/1997 | Shanton | 380/4 |
| 5,692,180 | 11/1997 | Lee | 1/1 |
| 5,701,451 | 12/1997 | Rogers et al. | 1/1 |
| 5,710,918 | 1/1998 | Lagarde et al. | 345/348 |
| 5,727,175 | 3/1998 | Malone | 345/356 |
| 5,765,028 | 6/1998 | Gladden | 706/25 |

OTHER PUBLICATIONS

Intelligent Agents Project at IBM T.J. Watson Research, http://www.research.ibm.com/iagents/home.html, pp. 1–3, Mar. 1998.

P. R. Cohen and R. Kjeldsen, "Information Retrieval By Constrained Spreading Activation in Semantic Networks", Information Processing and Management, vol. 23, No. 4, pp. 255–628, 1987.

W. B. Croft and T. J. Lucia, "Retrieving Documents By Plausible Interferece: An Experimental Study", Information Processing and Management, vol. 25, No. 6, pp. 599–614, 1989.

M. E. Frisse, "Searching for Information In A Hypertext Medical Handbook", Communications of the ACM, ACM 0001–0782.88/0700–0880, vol. 31, No. 7, pp. 880–886, Jul. 1988.

J. Savoy, Citation Schemes in Hypertext Information Retrieval, Citation Schemes in Hypertext Information Retrieval, Chapter 5, Universite de Neuchatel (Switzerland) pp. 99–120.

Primary Examiner—Paul R. Lintz
Assistant Examiner—Diane D. Mizrahi
Attorney, Agent, or Firm—Louis J. Percello; McGinn & Gibb, P.C.

[57] ABSTRACT

Topically relevant objects in an object database are first identified using any generally known methods to obtain a set of topically relevant objects (topically relevant set). Parents, and in alternative embodiments other ancestors, of one or more of the topically relevant objects are identified according to directional structural relationships that the parents have with respect to the topically relevant objects. These objects form a set of structurally relevant objects (structurally relevant set). In some embodiments, the user query identifies one or more of these structural relationships. The topically relevant objects are then organized under one or more of their respective parents to form a hierarchy level of both (topically relevant and structurally relevant) sets of objects. In some preferred embodiments, the process can iterate to create more than one hierarchy level.

23 Claims, 11 Drawing Sheets

| NUMBER, 220 | OBJECT ID, 225 | OBJECT POINTER, 230 | TITLE, 235 | ATTR. 1 | ... | ATTR. n |
|---|---|---|---|---|---|---|
| DOC 1 | | | | | | |
| DOC 2 | | | | | | |
| DOC 3 | | | | | | |
| DOC 4 | | | | | | |
| ... | | | | | | |
| DOC z | | | | | | |

ATTRIBUTES, 240 (spans ATTR. 1 ... ATTR. n), 215, 245

OBJECT CATALOG, 210

FIG.6A
PRIOR ART

| NAME, 255 | VALUE, 260 |
|---|---|
| NAME 1 | VALUE 1 |
| ... | ... |
| NAME n | VALUE n |

ATTRIBUTE TABLE, 250

FIG.6B
PRIOR ART

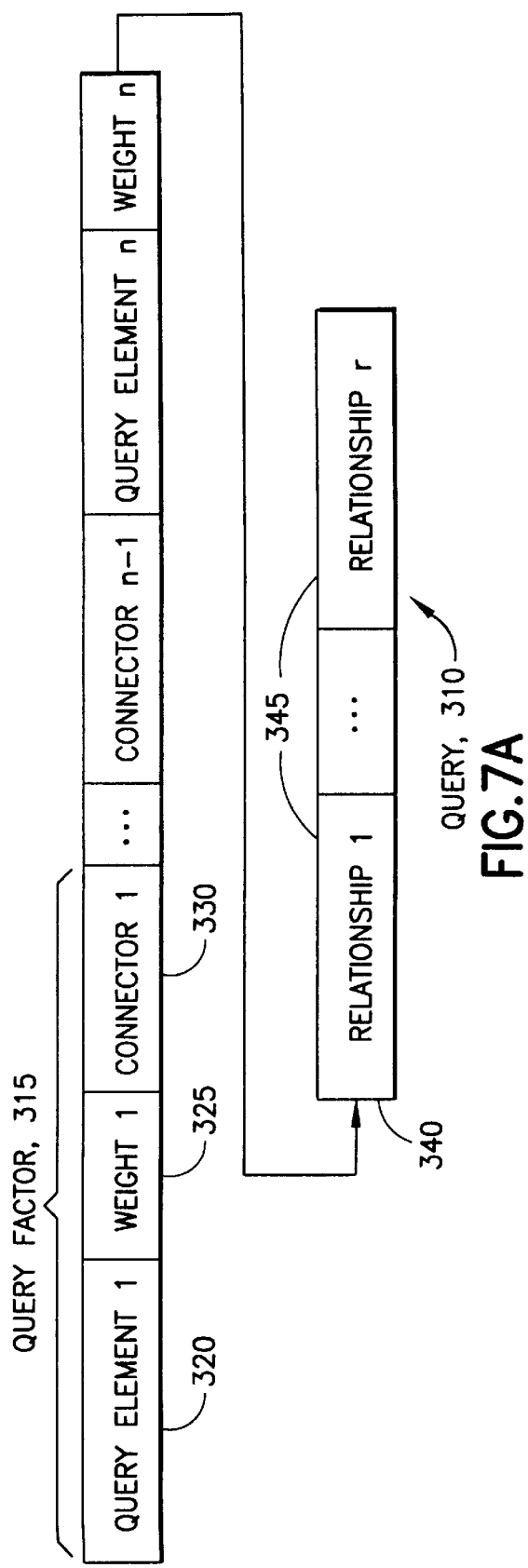
FIG.7A QUERY, 310
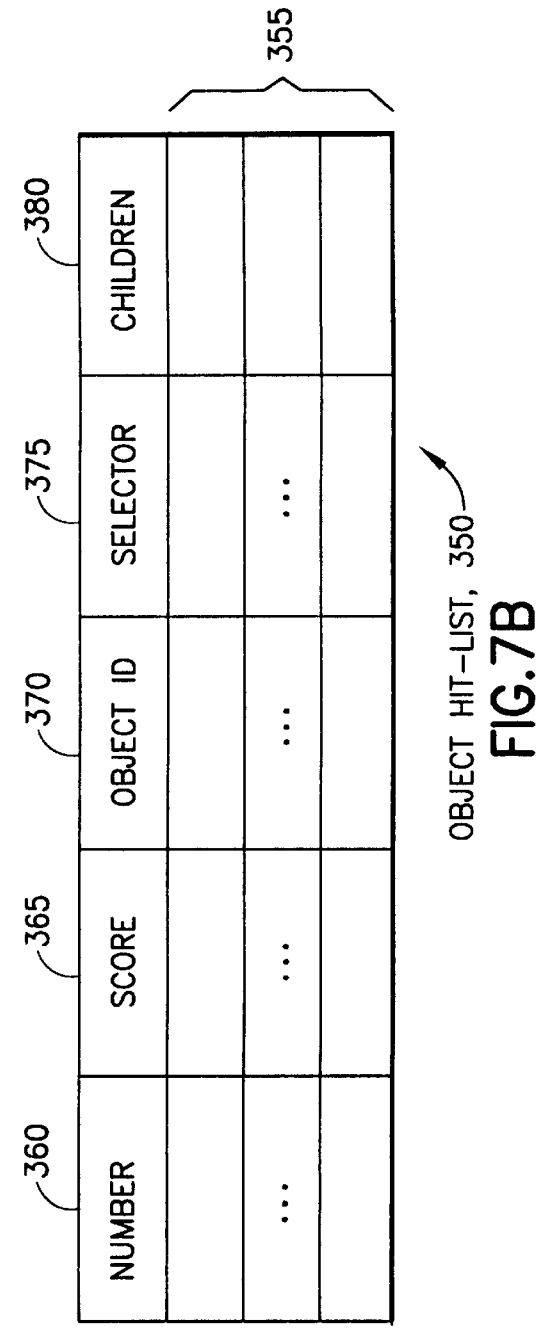
FIG.7B OBJECT HIT-LIST, 350

SYSTEM AND METHOD FOR HIERARCHICALLY GROUPING AND RANKING A SET OF OBJECTS IN A QUERY CONTEXT BASED ON ONE OR MORE RELATIONSHIPS

FIELD OF THE INVENTION

This invention relates to the field of searching and navigating a large object collection, particularly a hypermedia database in a networking environment. More specifically, the invention relates to a system and method for generating grouped hierarchical views (with ranking) for a set of (hypermedia) objects in a query context based on one or more relationships.

BACKGROUND OF THE INVENTION

A hypermedia object database is a collection of hypermedia objects stored electronically as files on one or more computers. Hypermedia objects contain information in the form of text, images, sound, or video. Hypermedia objects may also participate in relationships, where a relationship identifies one or more hypermedia objects that are related somehow (a hypermedia object may be related to itself). One common relationship is the hyperlink relationship. Two hypermedia objects are related by a (directed) hyperlink relationship if one of the objects contains a hyperlink pointer to the other object. A hyperlink pointer is a reference to a hypermedia object that allows the target object to be accessed directly from the source object.

Users access a hypermedia object database to locate objects of interest and retrieve those objects for processing (e.g., reading, viewing, listening, analysis). Finding objects of interest by manually inspecting every object in a large database is impractical. Instead, users typically search the database for interesting objects using a search system. A search system allows a user to express an information need in the form of a query. The system's search engine processes the query and returns to the user a hit-list of relevant objects. The user then selects interesting objects from the hit-list and retrieves those objects.

A relational database management system (RDBMS) may be used to index and search arbitrary hypermedia objects based on their attributes. Attributes include items such as size, creation date, author, and title. Searching for objects in this fashion is well known. In addition to attribute-based searching, users may want to search for hypermedia objects based on their content. The algorithms and data structures used by a content-based search system depend on the kind of object being searched. Text objects are typically searched using an information retrieval (IR) system (e.g., IBM Search Manager/2, a trademark of the IBM Corporation). Image objects are typically searched using an image indexing and retrieval system (e.g., IBM QBIC, a trademark of the IBM Corporation). Content-based search techniques for video and sound exist and have been incorporated into prototype systems, but this technology is less mature than text and image search. Objects found using an attribute-based or content-based search system are said to be "topically relevant" to the query.

Some prior art content-based search systems attempt to improve the search results for hypermedia object databases by refining object relevance scores based on the structural relationships (e.g., hyperlinks) between the objects. Three representative techniques are used by these systems. The first technique is a form of "spreading activation," where object relevance scores are propagated along outbound hyperlink pointers to neighboring objects and used to modify the relevance scores of those objects (see Cohen, P. R., and Kjeldsen, R. "Information Retrieval by Constrained Spreading Activation in Semantic Networks," Information Processing & Management, 23(2), pp. 255–268, 1987; Savoy, J. "Citation Schemes in Hypertext Information Retrieval," in M. Agosti and A. Smeaton (Eds.), Information Retrieval and Hypertext, Boston, Kluwer Academic Publishers, pp. 99–120, 1996). This procedure is typically iterated until a steady-state is reached or some terminating condition is met.

The objects are then sorted by their final relevance scores and returned on a flat hit-list (i.e., the hit-list simply enumerates the objects without describing any structural relationships).

In the second technique, it is assumed that the hypermedia objects are organized in a given hierarchy, such that every object has at most one parent and the children of a given object are explicitly identified. An object's relevance score is then calculated as a function of its content-based relevance score and the relevance scores of its children. Relevance scores must be propagated from the leaves of a hierarchy to the root (see Frisse, M. E. "Searching for Information in a Hypertext Medical Handbook," Communications of the ACM, 31(7), pp. 880–886, 1988). The objects are then sorted by their final relevance scores and returned on a flat hit-list.

In the third technique, the content of neighboring objects is added to the content of the current object when determining the relevance score for the current object (see Croft et al. "Retrieving Documents by Plausible Inference: an Experimental Study," Information Processing & Management, 25(6), pp. 599–614, 1989). Neighboring objects are those objects to which the current object contains hyperlink pointers. As in the previous two techniques, objects are sorted by their relevance scores and returned on a flat hit-list.

The above cited references are incorporated by reference in their entirety.

Regardless of the search technology being used, most search systems follow the same basic procedure for indexing and searching a hypermedia object database. First, the objects to be searched must be input to the search system for indexing. Next, attributes and/or contents are extracted from the objects and processed to create an index. An index consists of data that is used by the search system to process queries and identify relevant objects. After the index is built, queries may be submitted to the search system. The query represents the user's information need and is expressed using a query language and syntax defined by the search system. The search system processes the query using the index data for the database and a suitable similarity ranking algorithm, and returns a hit-list of topically relevant objects. The user may then select relevant objects from the hit-list for viewing and processing.

A user may also use objects on the hit-list as navigational starting points. Navigation is the process of moving from one hypermedia object to another hypermedia object by traversing a hyperlink pointer between the objects. This operation is typically facilitated by a user interface that displays hypermedia objects, highlights the hyperlinks in those objects, and provides a simple mechanism for traversing a hyperlink and displaying the referent object. One such user interface is a Web browser (see below). By navigating, a user may find other objects of interest.

In a networking environment, the components of a hypermedia object database system may be spread across multiple computers. A computer comprises a Central Processing Unit (CPU), main memory, disk storage, and software (e.g., a personal computer (PC) like the IBM ThinkPad. (ThinkPad is a trademark of the IBM Corporation.) A networking environment consists of two or more computers connected by a local or wide area network (e.g., Ethernet, Token Ring, the telephone network, and the Internet.) (See for example, U.S. Pat. No. 5,371,852 to Attanasio et al. issued on Dec. 6, 1994 which is herein incorporated by reference in its entirety.) A user accesses the hypermedia object database using a client application on the user's computer. The client application communicates with a search server (the hypermedia object database search system) on either the user's computer (e.g. a client) or another computer (e.g. one or more servers) on the network. To process queries, the search server needs to access just the database index, which may be located on the same computer as the search server or yet another computer on the network. The actual objects in the database may be located on any computer on the network.

A Web environment, such as the World Wide Web on the Internet, is a networking environment where Web servers, e.g. Netscape Enterprise Server and IBM Internet Connection Server, and browsers, e.g. Netscape Navigator and IBM WebExplorer, are used. (Netscape Navigator is a trademark of the Netscape Communications Corporation and WebExplorer is a trademark of the IBM Corporation.) Users can make hypermedia objects publicly available in a Web environment by registering the objects with a Web server. Moreover, users can create arbitrary relationships between these objects, even if the objects were created by another user. Other users in the Web environment can then retrieve these objects using a Web browser. The collection of objects retrievable in a Web networking environment can be considered as a large hypermedia object database.

To create an index for a hypermedia object database in a Web networking environment, the prior art often uses Web crawlers, also called robots, spiders, wanderers, or worms (e.g., WebCrawler, WWWWorm), to gather the available objects and submit them to the search system indexer. Web crawlers make use of the (physical) hyperlinks stored in objects. All of the objects are gathered by identifying a few key starting points, retrieving those objects for indexing, retrieving and indexing all objects referenced by the objects just indexed (via hyperlinks), and continuing recursively until all objects reachable from the starting points have been retrieved and indexed. The graph of objects in a Web environment is typically well connected, such that nearly all of the available objects can be found when appropriate starting points are chosen.

Having gathered and indexed all of the objects available in the Web environment, the index can then be used, as described above, to search for objects in the Web. Again, the index may be located independently of the objects, the client, and even the search server. A hit-list, generated as the result of searching the index, will typically identify the locations of the relevant objects on the Web, and the user will retrieve those objects directly with their Web browser.

STATEMENT OF PROBLEMS WITH THE PRIOR ART

When searching a hypermedia object database, the prior art fails to create a hierarchically structured search result based on arbitrary relationships between the objects in the database. Some prior art systems consider relationships when ranking objects, but the final result in most of these systems is still a simple hit-list (comparable to systems that ignore relationships altogether) that conveys no information about the relationships between the objects. Those prior art systems that can display a hierarchically structured search result require that a single, pre-determined hierarchy be specified for all of the objects in the hypermedia database. For large databases (e.g., the World Wide Web), this requirement is impossible to satisfy, and in general, this requirement is restrictive and inflexible.

No prior art system fully exploits the relationships between objects in a hypermedia object database to 1) produce a search result that includes both topically and structurally relevant objects ("structurally relevant" objects are objects that may not be topically relevant, but are still relevant to the query due to their structural relationships with topically relevant objects), and 2) present the search results such that the end user can easily identify and exploit the relationships between the objects on the hit-list.

The prior art performs even worse in a networked multi-user environment, e.g. the World Wide Web, where documents are created by multiple authors and are poorly cross referenced. For example, when a hypertext document is created by a single author, its pages are typically well cross referenced and provide links to next, previous, parent, index, and table of contents pages. Even though a prior art search system ignores these links and identifies only topically relevant pages in the document, since the document is well cross referenced, the user can navigate to structurally relevant pages in the document by following the cross reference links. However, the user does not have this option in a networked multi-user environment where a second, independent author could create a related document with hypertext links to the document created by the first author. A relationship now exists between these two documents, but there are no good cross references from the first document to the second document, preventing the user from navigating to the second document. If the second document is not topically relevant to the user's query, the user will fail to find the second document even though it is structurally relevant to the query due to its relationship to the first document.

OBJECTS OF THE INVENTION

An object of this invention is a system and method that generates a hierarchical grouping of topically and structurally relevant objects in a query context.

An object of this invention is a system and method that generates a ranked, hierarchical grouping of topically and structurally relevant objects in a query context.

An object of this invention is a system and method that generates a hierarchical grouping of relevant objects in a query context based on one or more structural relationships.

An object of this invention is a system and method that generates ranked, hierarchical groupings of topically and structurally relevant objects in a query context in a networking environment.

An object of this invention is a system and method that generates a hierarchical grouping of topically and structurally relevant objects in a query context by: identifying objects that are structurally relevant, organizing structurally and topically relevant objects into meaningful groups, identifying navigational starting points, and presenting the groups to a user in a meaningful way.

SUMMARY OF THE INVENTION

The present invention is a system and method for identifying and hierarchically grouping one or more (hypermedia) objects that are topically relevant to a user query and/or have a structural relation with one another.

Topically relevant objects are first identified using any generally known methods to obtain a set of topically relevant objects (topically relevant set). Parents, and in alternative embodiments other ancestors, of one or more of the topically relevant objects are identified according to directional structural relationships that the parents have with respect to the topically relevant objects. These objects form a set of structurally relevant objects (structurally relevant set). In some embodiments, the user query identifies one or more of these structural relationships. The topically relevant objects are then organized under one or more of their respective parents to form a hierarchy level of both (topically relevant and structurally relevant) sets of objects. In some preferred embodiments, the process can iterate to create more than one hierarchy level.

In alternative embodiments, subsets of the topically relevant set can be selected, e.g., by rank, as the topically relevant set. Also, subsets of the structurally relevant set, e.g., by weighting, can be selected as the structurally relevant set. For example, the weight can be based on the number of hyperlink paths that connect the ancestor to one or more of the topically relevant objects, the strengths of these hyperlink paths, and other attributes of the ancestor, such as the total number of hyperlinks originating at the ancestor and the topical relevance of the ancestor.

BRIEF DESCRIPTION OF THE DRAWINGS

The foregoing and other objects, aspects and advantages will be better understood from the following detailed description of preferred embodiments of the invention with reference to the drawings that include the following:

FIG. 2, comprising

FIG. 6, includes prior art FIGS. 6A and 6B, where FIG. 6A shows an object catalog, and FIG. 6B a table of named attribute values for objects in the catalog.

FIG. 7 comprises FIGS. 7A and 7B, where FIG. 7A shows a structured query and FIG. 7B shows an object hit-list.

FIG. 12, comprising

DETAILED DESCRIPTION OF THE INVENTION

Figure 1:
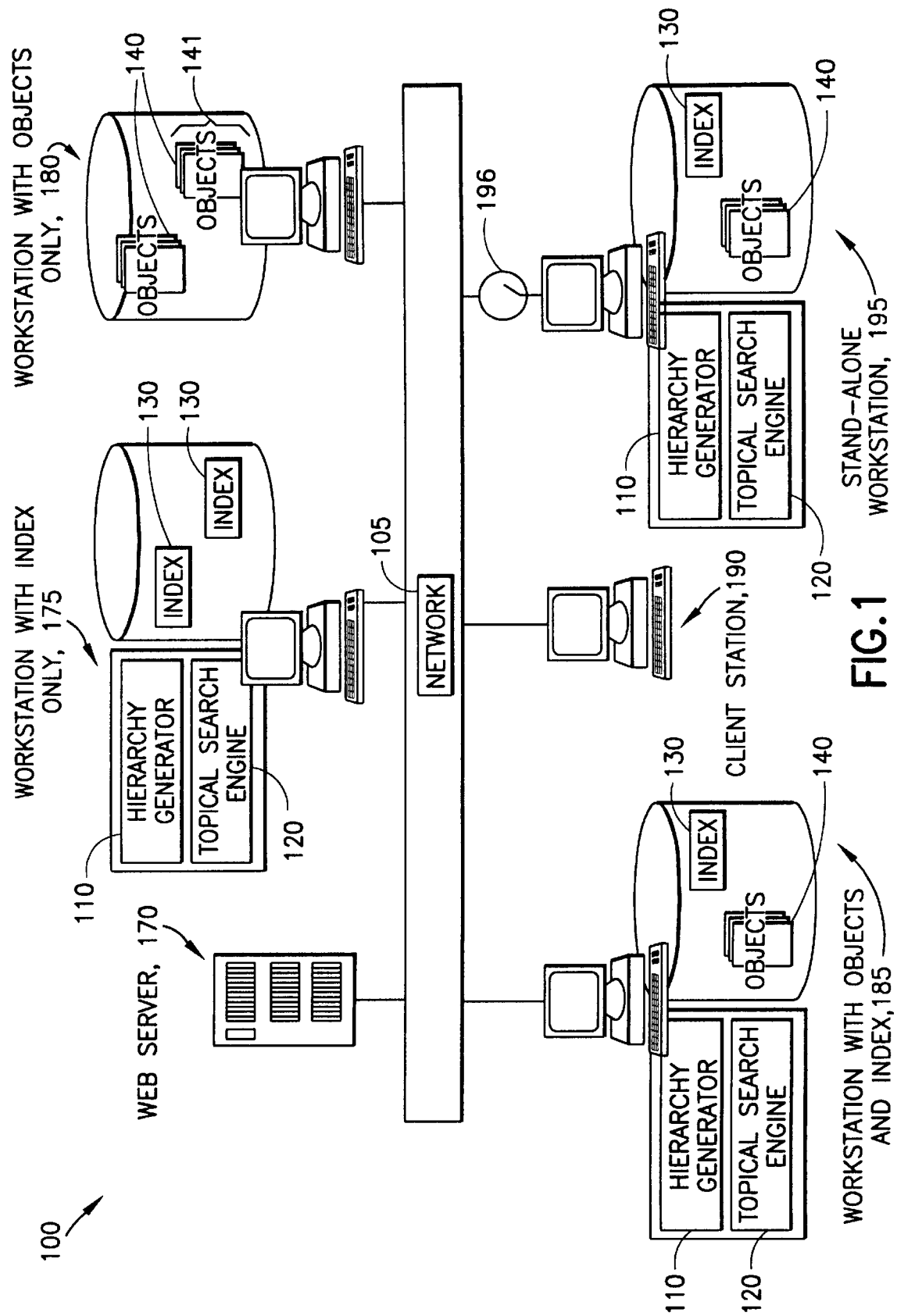
FIG. 1 is a block diagram of the computing environment in which the present invention is used in a non limiting preferred embodiment.

FIG. 1 is a block diagram of the computing environment in which the present invention is used in a non limiting preferred embodiment. The figure shows some of the possible hardware, software, and networking configurations that make up the computing environment.

The computing environment or system 100 comprises one or more general purpose computers 170, 175, 180, 185, 190, and 195 interconnected by a network 105. Examples of general purpose computers include the IBM Aptiva personal computer, the IBM RISC System/6000 workstation, and the IBM POWER parallel SP2. (These are Trademarks of the IBM Corporation.) The network 105 may be a local area network (LAN), a wide area network (WAN), or the Internet. Moreover, the computers in this environment may support the Web information exchange protocol (HTTP) and be part of a local Web or the World Wide Web (WWW). Some computers (e.g., 195) may occasionally or always be disconnected 196 from the network and operate as stand-alone computers.

Hypermedia objects 140 are items such as books, articles, reports, pictures, movies, or recordings that contain text, images, video, audio, or any other multimedia object and/or information. One or more hypermedia objects are stored on one or more computers in the environment.

To find a particular hypermedia object in the environment, a query (see FIG. 7A) is submitted for processing to a topical search engine 120 running on a computer in the environment. The topical search engine uses an index 130 to identify hypermedia objects that are relevant to the query. The topical search engine creates an index by indexing a particular set of hypermedia objects in the environment, called a hypermedia object database 141. A hypermedia object database 141 may comprise hypermedia objects located anywhere in the computing environment, e.g., spread across two or more computers. The relevant hypermedia objects identified by the index are ranked and returned by the topical search engine in the form of a hit-list (see FIG. 7B). The process is well known in the prior art. Examples of topical search engines include Search Manager/2 (a trademark of the IBM corporation.)

The result of the search is further processed by submitting the query and topical search engine results to a novel hierarchical view generator 110. The hierarchical view generator 110 uses structural relationships in the index 130 (see FIG. 8) to analyze (parent selection and ranking) the relationships in the database and improve the search result. The structural relationships are stored in the index by the hierarchical view generator at indexing time. In some preferred embodiments, the hierarchical view generator selects structurally relevant objects by calculating parent ranks based on the ranks of the topically relevant objects (generated by the topical search engine) and/or the (weighted) structural relationships in which the topically relevant objects participate. Structurally relevant objects have a structural relationship (see FIG. 8) with one or more of the topically relevant objects. (Structurally relevant objects may or may not be topically relevant.) The hierarchical view generator then aggregates topically relevant objects based on their relationships and generates ranked hierarchies of both the topically relevant objects and structurally relevant objects to present to the user. For convenience, the topical search engine 120 and hierarchical view generator 10 are shown here as separate components. Note, however, that both systems may be internal components of a general hypermedia object search system.

Hypermedia objects 140 and/or indexes 130 on one computer may be accessed over the network by another computer using the Web (http) protocol, a networked file system protocol (e.g., NFS, AFS), or some other protocol. Services on one computer (e.g., topical search engine 120) may be invoked over the network by another computer using the Web protocol, a remote procedure call (RPC) protocol, or some other protocol.

A number of possible configurations for accessing hypermedia objects, indexes, and services locally or remotely are depicted in the present figure. These possibilities are described further below.

One configuration is a stand-alone workstation 195 that may or may not be connected to a network 105. The stand-alone system 195 has hypermedia objects 140 and an index 130 stored locally. The stand-alone system 195 also has a topical search engine 120 and hierarchical view generator 110 installed locally. When the system is used, a query is input to the workstation 195 and processed by the local topical search engine 120 and hierarchical view generator 110 using the index 130. The results from the topical search engine are output by the workstation 195.

A second configuration is 185, a workstation with hypermedia objects and indexes connected to a network 105. This configuration is similar to the stand-alone workstation 195, except that 185 is always connected to the network 105. Also, the local index 130 may be derived from local hypermedia objects 140 and/or remote hypermedia objects accessed via the network 105, and created by either a local topical search engine 120 and hierarchical view generator 110 or a remote topical search engine 120 and/or a remote hierarchical view generator 110 accessed via the network 105. When queries are input at the workstation 185, they may be processed locally at 185 using the local topical search engine 120, local hierarchical view generator 110, and local index 130. Alternatively, the local topical search engine 120 and hierarchical view generator 110 may access a remote index 130 (e.g. on system 175) via the network 105. Alternatively, the workstation 185 may access a remote topical search engine 120 and/or hierarchical view generator 110 via the network 105.

Another possible configuration is 175, a workstation with an index only. Computer 175 is similar to computer 185 with the exception that there are no local hypermedia objects 140. The local index 130 is derived from hypermedia objects 140 accessed via the network 105. Otherwise, as in computer 185, the index 130, topical search engine 120, and hierarchical view generator 110 may be accessed locally or remotely via the network 105 when processing queries.

Another possible configuration is computer 180, a workstation with hypermedia objects only. The hypermedia objects 140 stored locally at computer 180 may be accessed by remote topical search engines 120 and hierarchical view generators 110 via the network 105. When queries are entered at computer 180, the topical search engine 120, hierarchical view generator 110, and index 130 must all be accessed remotely via the network 105.

Another possible configuration is computer 190, a client station with no local hypermedia objects 140, index 130, topical search engine 120, or hierarchical view generator 110. When queries are entered at computer 190, the topical search engine 120, hierarchical view generator 110, and index 130 must all be accessed remotely via the network 105.

Another possible configuration is computer 170, a typical web server. Queries are entered at another workstation (e.g., 175, 180, 185, or possibly 195) or a client station (e.g., 190) and sent for processing to the web server 170 via the network 105. The web server 170 uses a remote topical search engine 120, hierarchical view generator 110, and index 130 (accessed via the network 105) to process the query. Alternatively, one or more of these functions (110, 120, and 130) can reside on the web server 170. The results are returned to the workstation or client station from which the query was originally sent.

Figure 2A:
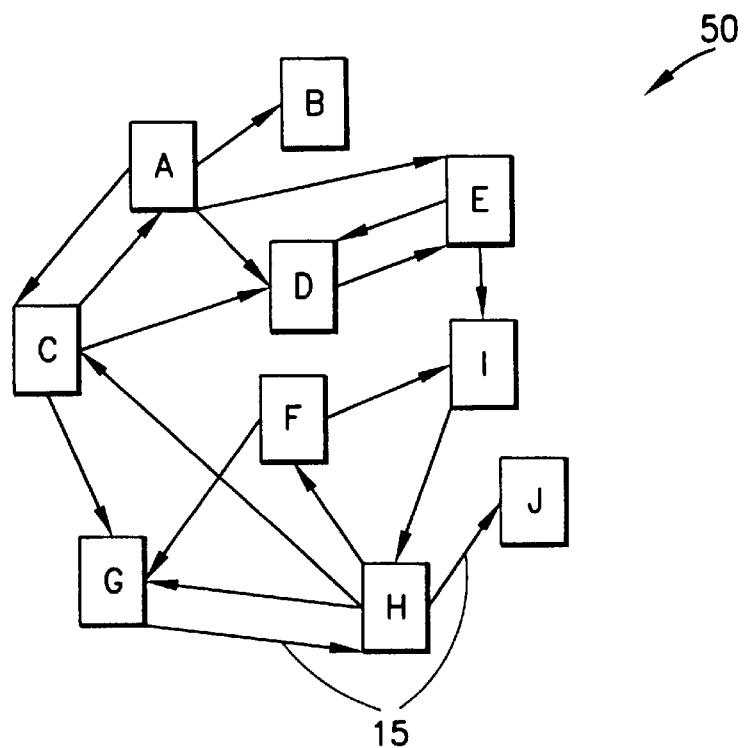
FIGS. 2A and 2B, is a block diagram of an example object collection, in particular a hypermedia object database.
Figure 2B:
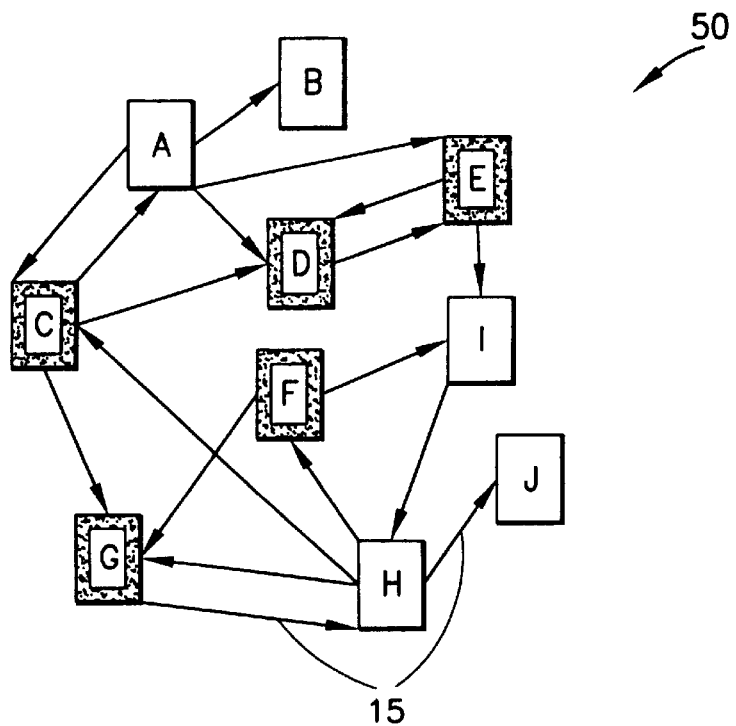
Figure 3:
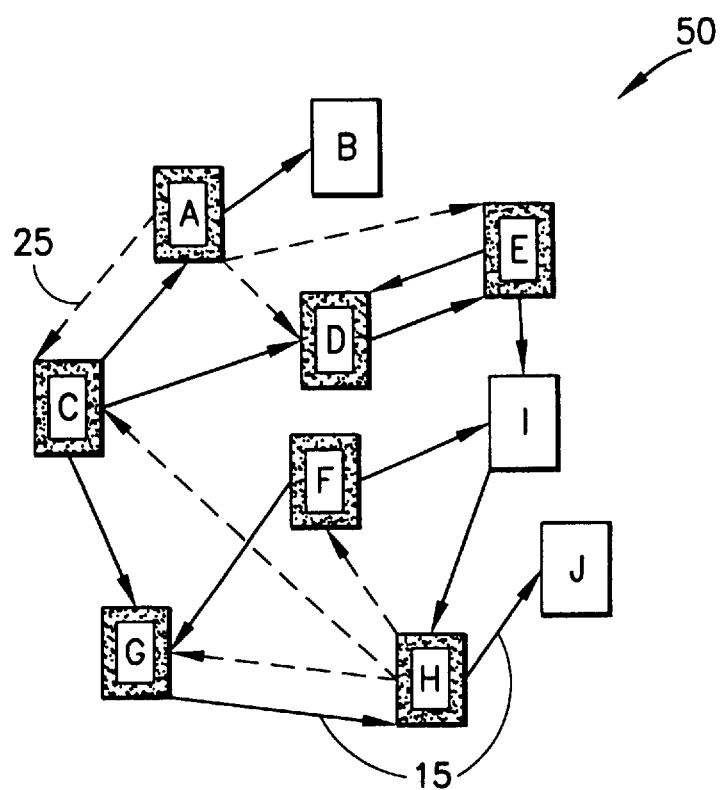
FIG. 3 is a block diagram of an example hypermedia object database that is hierarchically grouped by the present invention.

FIGS. 2 and 3 give an intuitive description of the current invention. The current invention operates on an object collection, which consists of objects and directed relationships between those objects. (The hypermedia object database 141 in FIG. 1 is an example of an object collection.) An object is an identifiable entity that typically contains data, called the object's content. The nature of this data depends on the kind of object. For example, a document object would contain text data, while an image object would contain image data.

A directed relationship describes how objects in the object collection are related to each other. A directed relationship R consists of a set of instances of R, where an instance of relationship R, denoted R(o1,o2), indicates that relationship R holds from object o1 to object o2. Each relationship instance may optionally have a weight associated with it, e.g., R(o1,o2,w), where w is the weight of the instance of relationship R between objects o1 and o2. If R(o1,o2), then object o1 is a parent of object o2, and object o2 is a child of object o1. If object o2 can be reached from object o1 by following one or more instances of relationship R, then there is a path in relationship R from object o1 to object o2. The weight of a path is a function of, e.g. the sum total, of the weights of the relationship instances that make up the path. A directed relationship defines a structural organization of the objects in the collection, therefore a directed relationship is also called a structural relationship.

Note that an undirected relationship is supported by representing it as a directed relationship that holds in both directions, e.g., undirected relationship U between object o1 and object o2 would be represented by two instances of the directed relationship U', e.g., U'(o1,o2) and U'(o2,o1).

An example of a directed relationship is the hyperlink relationship H. If object o1 contains a hyperlink pointer to object o2, then H(o1,o2). Other examples of directed relationships include the subclass or categorization relationship, the geographic location relationship, the location within a file system relationship, the conceptual relationship, and the is-a-part-of relationship. (Note that this invention applies to all sets of general objects with directed relationships (or "bi-directional" representations of undirected relationships), i.e. structural relationships. In many parts of this disclosure, these general objects are referred to as hypertext objects with structural relationships being hyperlink relationships. This is done for convenience without loss of generality.)

FIG. 2, comprising FIGS. 2A and 2B, is a block diagram of an example object collection, in particular a hypermedia object database 50 comprising a set of hypermedia objects, typically A–J, with hyperlinks, typically 15, between them. The hyperlinks define a structural relationship on the hypermedia objects in the database. Note that this is just one possible example object collection. Many other kinds of object collections exist with many different kinds of objects and many different relationships, all of which are within the domain of the current invention. FIG. 2A shows the initial state of the hypermedia object database. FIG. 2B depicts the database after a topical search engine 120 has been used to search the database. The topical search engine analyzes the contents of the hypermedia objects to identify the topically relevant objects, e.g. C–G, which are shaded in FIG. 2B. At this point, generally known topical search engines 120 would present this result to the user by simply reporting objects C–G in relevance rank order on the hit-list.

FIG. 3 is a block diagram of the same example hypermedia object database shown in FIG. 2A, with the addition of an example search result (differently shaded) produced by the current invention (the hierarchical view generator 110). When searching the hypermedia object database 5, topically relevant objects, C–G, are first identified using any general topical search engine, as shown in FIG. 2B.

Then, the hierarchical view generator identifies parent objects, e.g. A and H, of the topically relevant objects, C–G, by examining the (hyperlink) structural relationship. In one preferred embodiment, the hierarchical view generator ranks each parent based on the number of the hyperlink paths from the parent to the topically relevant objects and sometimes factors in a function of the weights of those paths. In some embodiments, the hierarchical view generator includes only the top ranking parents in the search result. The (top ranking) parents are structurally relevant objects, i.e., objects that may not be topically relevant, but are still relevant to the query due to their structural relationships with topically relevant objects. Note that topically relevant objects may also be structurally relevant.

Thus the invention selects from the database of objects a set of one or more topically relevant objects (the topically relevant set, C–G) and a set of one or more structurally relevant objects (the structurally relevant set, A and H). Here the structurally relevant set includes objects that are parents of the objects in the topically relevant set. Note that the parents (optionally the top ranking parents) are structurally relevant objects, i.e., objects that may not be topically relevant, but are still relevant to the query due to their structural relationships with topically relevant objects. Note that topically relevant objects may also be structurally relevant. Further note that structurally relevant objects do not have to have a parent structural relationship to one or more topically relevant objects, but can have any ancestral relationship defined by the path to the topically relevant object(s). Also, one or more structural relationships can be used. (See below for a more detailed description.)

The identification of structurally relevant objects by the hierarchical view generator provides a number of benefits. First, relevant objects that were missed by the topical search engine are found by the hierarchical view generator and returned to the user. The topical search engine finds only those objects whose content matches the particular query terms selected by the user. In the current hypermedia object database example, additional (structurally) relevant objects can be found by considering the hyperlink pointers incident on the topically relevant objects. Hyperlink pointers are typically used to cite related objects, direct readers to related objects, or provide a path for reading the different components of a hypermedia object. Therefore, the more hyperlink pointers an object has to the set of topically relevant objects, the more likely it is that the object is relevant to the query. Moreover, if an object points to many topically relevant objects, that object is likely to contain a more general discussion of the query topic.

Second, the structurally relevant objects found by the hierarchical view generator are good navigational starting points. Good navigational starting points are those objects from which many topically relevant objects can be reached by following one or more directed relationship paths from the starting point. In FIG. 3, structurally relevant objects A and H have been shaded, and their hyperlinks to the original set of topically relevant objects (C–G) have been emphasized with a different shading, typically 25. It can be seen from the hyperlink structure that by starting with either object A or H, all of the topically relevant objects (C, D, E, F, and G) in the database can be reached by following a single hyperlink. Because objects A and H together provide hyperlink pointers to all of the topically relevant objects, they are good navigational starting points for browsing the hypermedia object database given the current interest of the user.

Third, using the structurally relevant objects, the hierarchical view generator organizes the relevant objects into meaningful groups or clusters. Groups are formed based on the following observation: a parent object often contains information on a particular theme, so its children are likely to share that common theme. In FIG. 3, parent objects A and H each provide a grouping or clustering of the topically relevant objects. Object A contains hyperlink pointers to objects C, D, and E, while object H contains pointers to objects C, G, and F, such that the topically relevant objects are divided into two (overlapping) clusters. It can be inferred that objects C, D, and E are related by the topic of object A, and objects C, G, and F are related by the topic of object H. Therefore, it is productive to organize the topically relevant objects into these two clusters and present this organization to the user.

Moreover, the groups created using the structurally relevant objects form a hierarchy of structurally and topically relevant objects. In FIG. 3, the dashed hyperlinks 25 organize the topically and structurally relevant objects into a hierarchy, which is much more meaningful to the user than an arbitrary graph, which is all that is known before the hierarchical view generator 110 executes. This hierarchical presentation shows only those objects that are structurally and topically relevant to the user query. The objects in this hierarchy can be ranked further if necessary.

Figure 4:
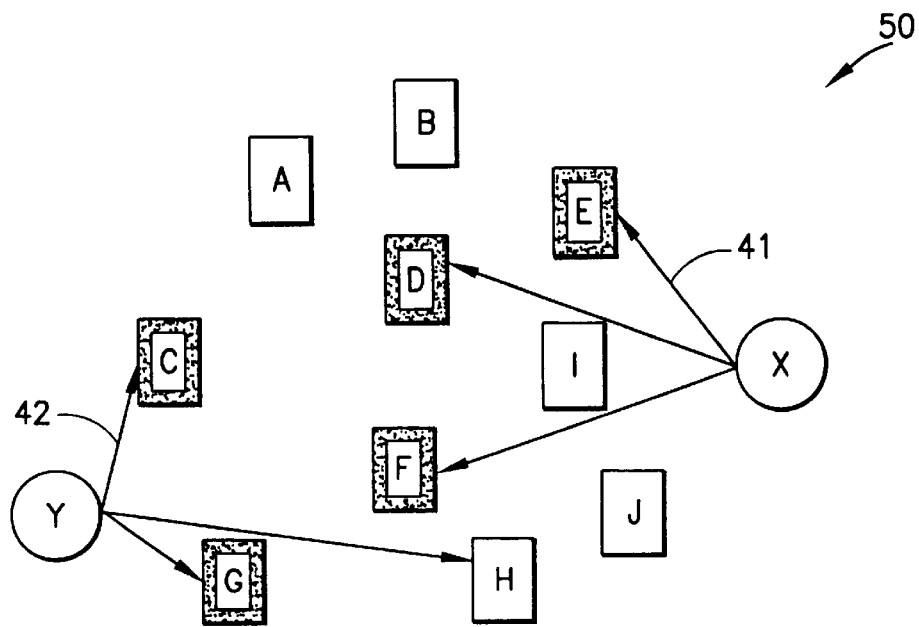
FIG. 4 is a block diagram of an example hypermedia object database that is hierarchically grouped as defined by a first structural relationship.
Figure 5:
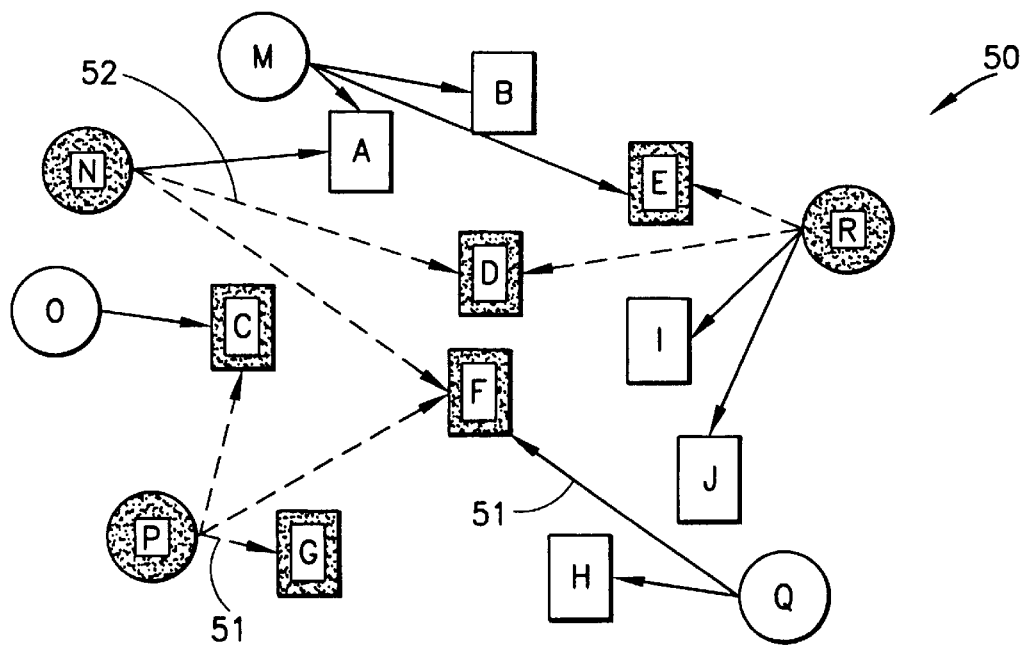
FIG. 5 is a block diagram of an example hypermedia object database that is hierarchically grouped as defined by a second structural relationship.

Note that by defining different structural relationships in the object collection (see FIG. 8), different paths exist and therefore, different sets of (parent) objects, i.e., different structurally relevant sets, are identified for any given set of topically relevant objects. FIGS. 4 and 5 explore this further.

FIG. 4 is a block diagram of the same example hypermedia object database 50 shown in FIG. 3, with the exception that an alternate result that might be produced by the current invention using a different relationship, e.g., geographic location, is highlighted. For clarity, the hyperlink pointers 15 between the objects A–J are not shown. Here, the objects participate in geographical (structural) relationships, typically X and Y. All objects that participate in the X relationship (i.e., are assigned to the geographical location described by X) are connected to X by structural links 41. All objects that participate in the Y relationship (i.e., are assigned to the geographical location described by Y) are connected to Y by structural links 42.

After the topically relevant objects C–G are identified by a topical search engine, the hierarchical view generator 110 uses the geographical relationship links 41 and 42 to identify the structural geographical relationship parents X and Y. X and Y can then be used to organize the search results into a hierarchy where topically relevant objects are grouped by geographic location.

FIG. 5 is a block diagram of the same example hypermedia object database 50 shown in FIG. 3, with the exception that an alternate result that might be produced by the current invention using a different relationship, e.g., category, is shaded. For clarity, the hyperlink pointers 15 between the objects A–J are not shown. Here, the objects participate in categorization relationships, typically M–R. All objects that participate in a given categorization relationship (i.e., are assigned to that category, possibly with some confidence weight) are connected to that category by structural links 51.

After the topically relevant objects C–G are identified by a topical search engine, the hierarchical view generator uses the categorization relationship links 51 to identify category relationship parents N, P, and R. Even though some topically relevant objects participate in multiple categorization relationships, the structural links 51 with confidence weights are used as evidence to identify N, P, and R as the parents. N, P, and R can then be used to organize the search results into a hierarchy where topically relevant objects are grouped by category. In particular, the structural links used for this grouping are highlighted as dashed links 52 in FIG. 5.

In subsequent figures, a number of data-structures are described as tables. This is for convenience of drawing and description. In an actual implementation, any usual data-structure such as a normal array, an associative array, a linked list, a hash table, or any other structure may equivalently be used without affecting the invention described herein. Note, however, that the tables described below can be readily implemented in any general relational database management system (RDBMS).

FIG. 6, comprising FIGS. 6A and 6B, is one preferred set of prior art data structures in the index 130 used to implement the present invention. The Object Catalog 210 in FIG. 6A stores information about each of the objects in the collection. The Object Catalog is a table that contains an entry 215 for each object in the collection. Each entry 215 contains the following information, represented by columns in the table 210: sequence Number 220 (the number or offset of the current entry in the table), Object Id 225 (a unique identifier for the object that corresponds to the current entry), Object Pointer 230 (a reference to the object corresponding to the current entry that allows the object to be retrieved), object Title 235 (the title of the object corresponding to the current entry) and a set 240 of Attributes 245 associated with the object corresponding to the current entry. In a preferred embodiment, each Attribute 245 is a pointer to an Attribute Table 250, shown in FIG. 6B. Using a table 250 permits an attribute to be a multi-dimensional value. Each dimension is given a Name 255 and a Value 260. Therefore, table 250 has a pair of Name 255 and Value 260 fields for each dimension of the attribute. These data structures are part of the index 130 and their contents would be filled in when the object collection is indexed.

FIG. 7, comprising FIGS. 7A and 7B, is one preferred set of data structures used to implement the present invention. In FIG. 7A, the data structure 310 represents a Query arranged in an array or list as a sequence of n Query Factors 315. Each Query Factor 315 consists of a Query Element 320, an optional Weight 325 and an optional Connector 330. The Query also contains a list 340 of zero or more relationships 345 (see FIG. 8) to be used by the Hierarchical View Generator 110 (see FIG. 10).

In FIG. 7B, a novel Object Hit-list, 350 is used to identify in rows 355 the objects out of Object Catalog 210 that have been selected as the result of a search by Topical Search Engine 120 or processing by Hierarchical View Generator 110, i.e., the topically relevant set and the structurally relevant set(s). Each row contains fields for the object's Number in the list 360, its computed Score/Rank 365 (assigned by the topical search engine 120 or the Hierarchical View Generator 110 (see FIG. 11)), its Object Id 370, a Selector 375 (used to mark entries for future processing), and a pointer to a Children Table 380 (see FIG. 9). The Children field 380 is only used when the Object Hit-list 350 is created by the Hierarchical View Generator 110, or only used for objects in the structurally relevant set(s).

Figure 8:
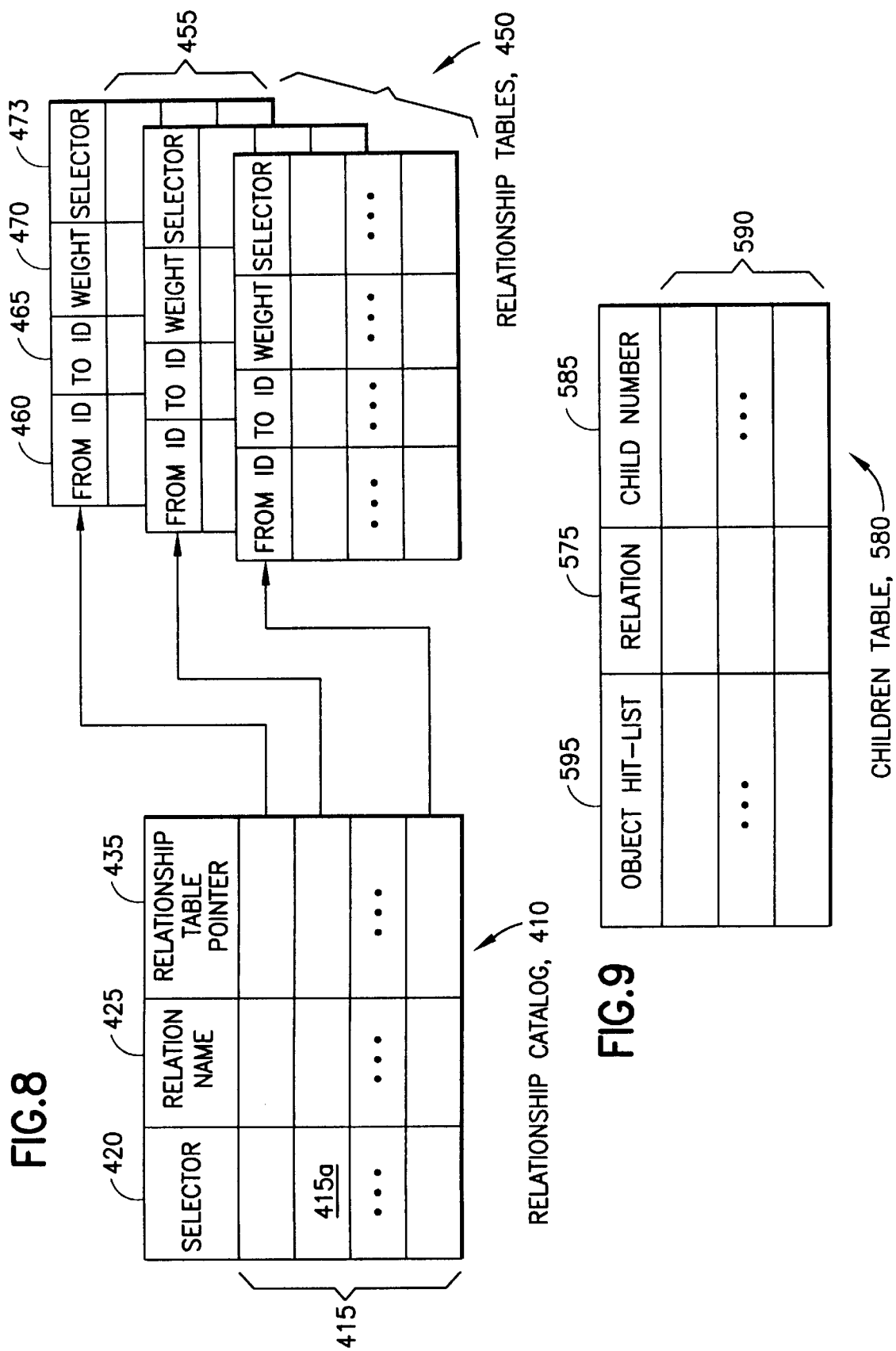
FIG. 8 shows a relationship catalog and several of the relationship tables to which the relationship catalog refers.

FIG. 8 is one preferred set of novel data structures in index 130 used to describe and catalog structural relationships in the object collection and implement the present invention. By definition, a relationship R is a set of ordered tuples (triples) of the form (o1, o2, w), where o1 and o2 are objects (and w is an optional weight.) The triple (o1, o2, w) indicates that the relationship R exists from object o1 to object o2 with weight w. For example, if relationship R is the hyperlink relationship, (o1, o2, w) indicates that object o1 contains a hyperlink pointer to object o2 with weight w. In FIG. 2A, this is shown as a structural link 15 from object o1 to object o2. Alternatively, if R is the categorization relationship, (o1, o2, w) indicates that object o2 belongs to the category o1 with weight w. In FIG. 5, this is shown as a structural link 51 from category o1 to object o2. The Relationship Catalog 410 is a table containing rows 415 for the purpose of cataloging the relationships in the object collections and determining which particular relationships are to be used to process the current query. The fields of the rows consist of Selector 420, Relationship Name 425, and Relationship Table Pointer 435. A Relationship Table 450 contains rows 455 showing how objects are related to each other by the current relationship. The fields of the rows 455 consist of From-Id 460, To-Id 465, and optional Weight 470, the triple above. Relationship Table 450 also has a Selector filed 473 used for marking selected entries 455 for later processing. The Relationship Catalog is generated at database indexing time and is part of the index 130.

Figure 9:
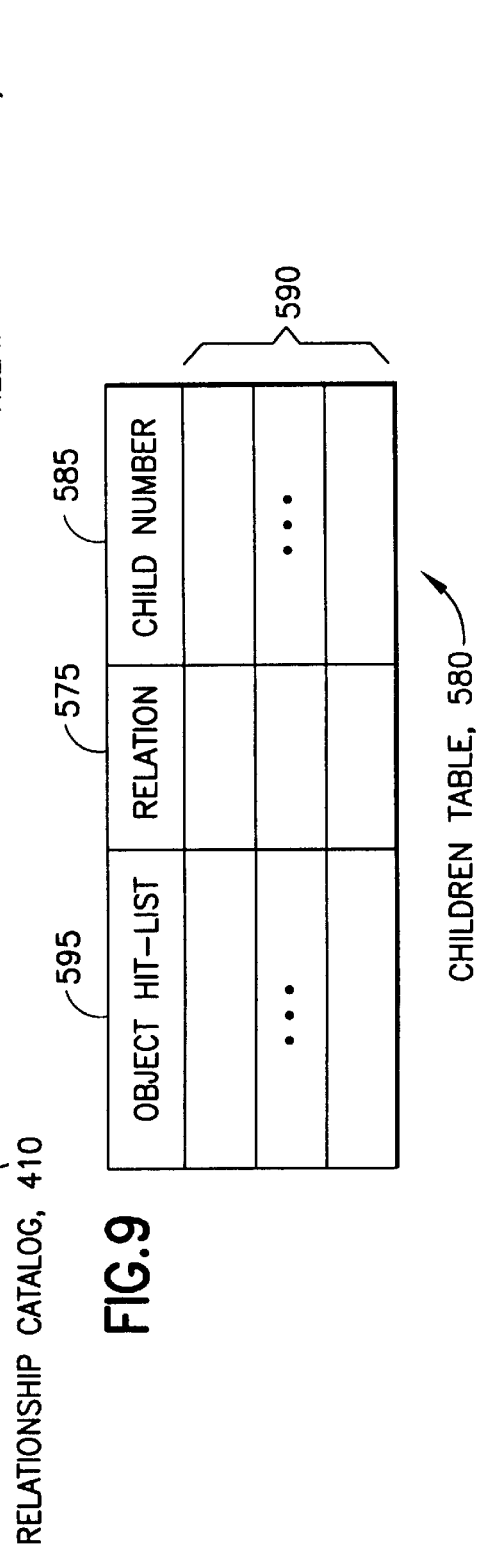
FIG. 9 a children table.

FIG. 9 is one preferred data structure used to implement the present invention. FIG. 9 shows Children Table 580 consisting of entries 590, where each entry has an Object Hit-list identifier field 595, a Child Number field 585, and a Relation field 575. The Object Hit-list identifier 595 identifies the Object Hit-list 350 that contains an entry for the current child object. The Child Number 585 is an index into the Number field 360 (of the Object Hit-list 350 identified in 595) identifying which entry 355 corresponds to the current child object. The Relation field 575 corresponds to Relation Name 425 in the Relationship Catalog 410, and identifies the relationship by which the child belongs to the corresponding parent.

Figure 10:
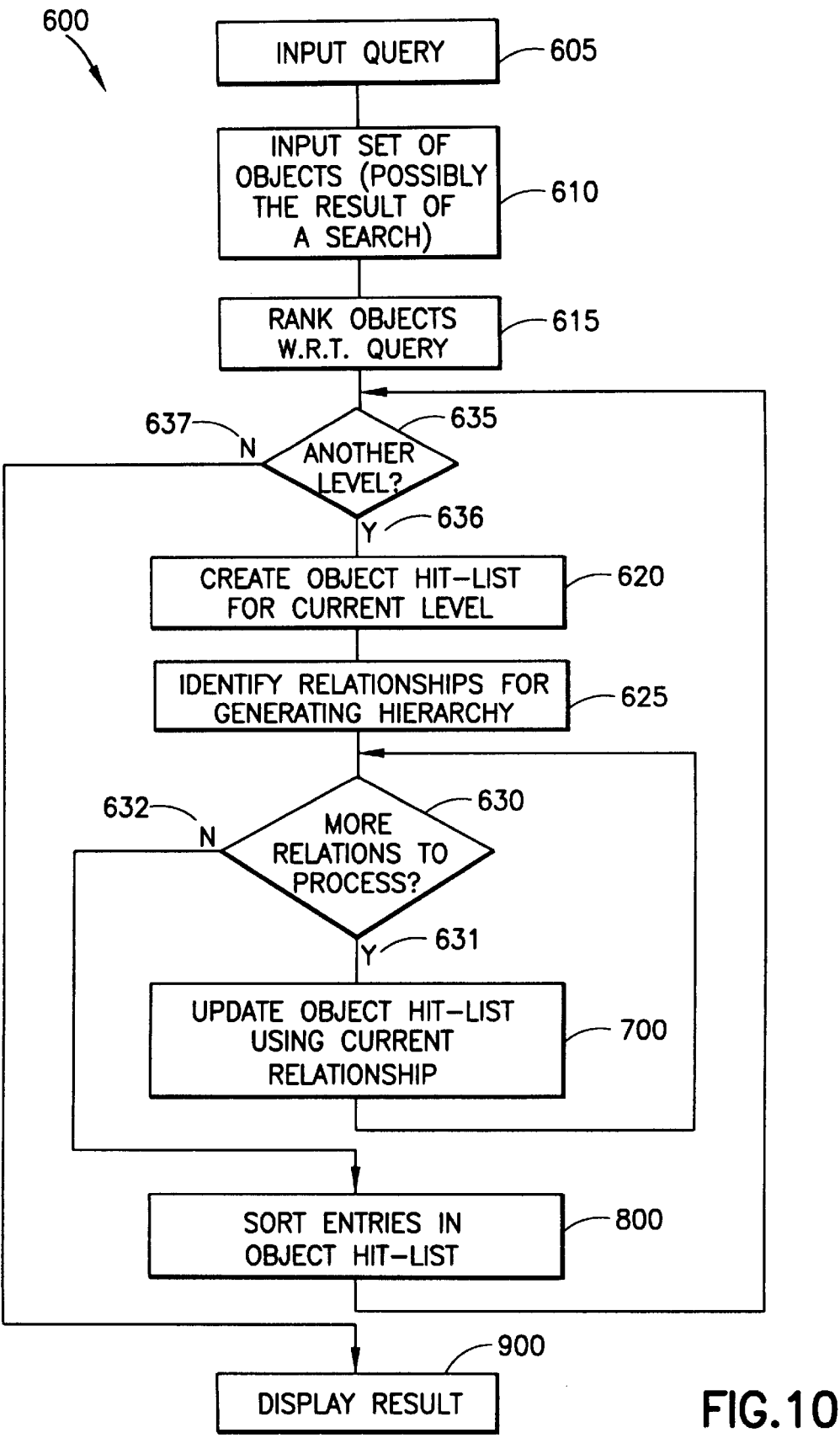
FIG. 10 is a flow chart showing the steps of one preferred hierarchical view generator process executed by the present invention.

FIG. 10 is a flowchart showing the method steps of one preferred process executed by the present invention. By executing the process 600, the system 110 produces ranked hierarchical views for a set of objects in a query context. In the descriptions of processes 600 and 700 that follow, the convention is used that if a numerical label is used to describe a quantity of like objects, such as rows in a table, and if it is necessary to indicate one specific such instance, then the numerical label is used with an alphabetic suffix, resulting in descriptors such as 123a, for example.

The process begins with a Query 310 entered by the user in step 605 and an Object Hit-list 350 of objects identified by the user in step 610. In a preferred embodiment the Object Hit-list 350, which identifies a subset of the objects in Object Catalog 210, is the hit-list of topically relevant objects (the topically relevant set) generated by a topical search engine with Query 310 on Object Collection 141 (i.e., a content-based search). In step 615, the objects listed in Object Hit-list 350 are ranked with respect to Query 310, with resulting object ranking values placed in Rank field 365. In a preferred embodiment, the object Ranks 365 are supplied with the Object Hit-list 350 in step 610, so ranking of the topically relevant objects by the present system is not necessary and step 615 is omitted.

Next, the system enters loop 635 where each iteration of the loop builds the next higher level of the result hierarchy. The loop is controlled by step 635, which tests whether or not to build another level of the hierarchy. If another level of the hierarchy should be built, branch 636 is taken. If the hierarchy building process is complete, branch 637 is taken. The test in step 635 may be performed in a variety of ways. In a highly interactive system, the user may be prompted as to whether or not to build another level of the hierarchy. This prompting may be accompanied by executing process 900 (described below) to display to the user the current result built so far. Alternatively, a pre-defined system constant may determine how many levels of the hierarchy to build.

When branch 636 is taken, the system executes a series of steps to add another level to the result hierarchy. Each level of the result hierarchy is stored in an Object Hit-List 350. The Object Hit-List 350 for the current level is created and initialized in step 620. Initialization involves setting all entries in the Object Hit-List 350 to null. In step 625, the relationships identified by the user in 340 (see FIG. 7A) are used to select relationships in the relationship catalog 410 for generating the next level of the hierarchy in subsequent steps. For each relationship 345 specified by the user, the Relationship Name column 425 is searched to find a match and the Selector field 420 of the matching entry 415 is set to 1. The Selector field 420 of all other entries is set to 0. Note that in some preferred embodiments, the relationships can be default relationships, and query component 340 is not provided by the user. For example, the default can be hypertext links.

Step 630 begins an iteration over all of the relationships selected in step 625. Each relationship 415 marked as selected in field 420 is processed as follows in turn, by following branch 631. The relationship currently being processed, called the current relationship, will be referred to as 415*a*. When all selected relationships have been processed, branch 632 is taken.

Each iteration of steps 630 and 700 produces one structurally relevant set defined by a given structural relationship, e.g., hypertext link, geographic location, category, etc. For each object in this structurally relevant set, if the object already appears in the current Object Hit-list 350, its entry 355 is updated, otherwise an entry for the object is added to the current Object Hit-list (see FIG. 1). All of the objects in the current Object Hit-list 350 define a structurally relevant set based on a combination of one or more structural relationships. This structurally relevant set is defined for the given level of the generated hierarchy (hierarchy level).

In step 700 (described in detail in FIG. 11), the Object Hit-list 350 for the current result hierarchy level being built is updated for the current relationship.

After all selected relationships have been processed, branch 632 is taken to step 635. At this point, a new level of the hierarchy (e.g. parent, grandparent, great-grandparent along a path) has been created and the objects in that level are identified by the entries 355 in the Object Hit-list 350 that was created and populated by the steps executed in the current iteration of 635. Each entry 355 has a Children field 380 that identifies the children of the current entry. The Children field 380 points to a Children Table 580, which contains an entry 590 for each child of the current object. Each Children Table entry 590 has an Object Hit-list field 595 that identifies the Object Hit-list 350*a* (the next lower level of the result hierarchy) that contains the child, a Child Number 585 that identifies the entry 355 in the Object Hit-list 350a that corresponds to the child object, and the Relation 575 that identifies the relationship by which this child belongs to the current object.

In step 800, the entries 355 in Object Hit-list 350 are sorted according to score 365, and the ranking order is entered into Number field 360. The process then iterates at step 635. Note that in one embodiment, there is only one hierarchy level, i.e., only parents of the topically relevant set. In this case, there is no iteration step 635 and the entries 800 can optionally be displayed 900 after step 800.

In step 900 (described in detail in FIG. 12), the results are displayed. Note that one or more levels of the hierarchy level can be suppressed in the display, e.g., grandparents are displayed but not parents.

Figure 11:
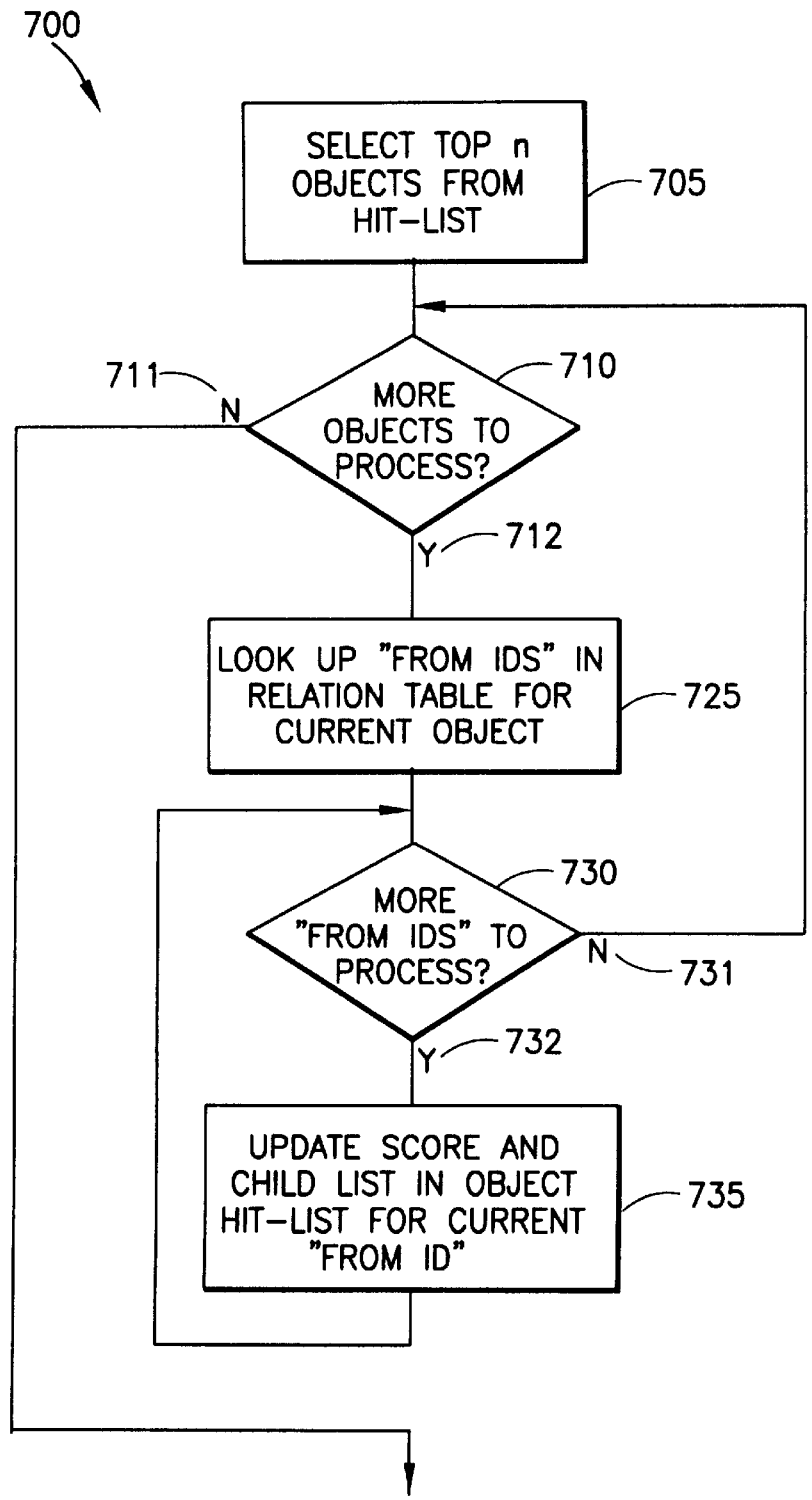
FIG. 11 is a flow chart showing the steps of a preferred process for scoring parent objects based on structural relationships.

FIG. 11 shows the steps for process 700 in detail. Step 700 identifies and ranks parent objects for the given child objects based on the current structural relationship. The parent objects are entered into the Object Hit-list 350 for the current result hierarchy level being built (i.e., the Object Hit-list 350 created in step 620). The given children are identified in a different Object Hit-list 350, which was either input in step 610 (if this is the first iteration of 635), or was created by the previous iteration of 635. To avoid confusion, the Object Hit-list for the current result hierarchy level being built (i.e., the parents) will be referred to as 350'.

Note that if this is the first iteration of 635, then the current child objects are the topically relevant objects identified by the topical search engine. Otherwise, the current child objects are the structurally relevant objects identified during the previous iteration of 635, and the parents currently being identified and ranked are at least grandparents of the topically relevant objects.

In step 705 the N top ranking child objects from the children Object Hit-list 350 are selected for further processing. This done by setting the Selector field 375 to 1 for those objects whose Number field 360 is less than or equal to N. N may be hard-wired into the system, i.e., a pre-defined value, or selected by the user. In one preferred embodiment a value of 10 to 20 would be suitable. The value of N is a trade-off between quality and performance. As N becomes larger, result quality will improve since more child objects are used to generate the hierarchy. However, as N becomes larger, more processing is required and performance deteriorates. Moreover, there are diminishing returns as N becomes larger, since lower ranked child objects are less relevant to the query.

In step 710 an iteration over each of the top N child Object Hit-list entries 355 whose Selector field 375 is set to 1 is performed to find their parents (as defined by the current structural relationship). The entry currently being processed, called the current object, will be referred to as 355*a*. If there are more objects to process, branch 712 is followed, otherwise branch 711 is followed.

In step 725, all of the instances of the current structural relationship in which the current child object participates (as a child) are selected. The Object Id 370 for the current Object Hit-list entry 355*a* is used to select entries 455 from the Relationship Table 450 for the current relationship 415*a*

(recall that 415a is the current relationship being processed in step 630, described above). An entry 455 is selected if its To Id 465 matches 370. Selected entries 455 are marked by setting their Selector field 473 to 1. The Selector field 473 for all other (non-selected) entries is set to 0.

In step 730 an iteration over each of the entries 455 whose Selector field 473 is set to 1 is performed to process each of the parent objects in the relationship instances identified in step 725. The entry currently being processed will be referred to as 455a. If there are more entries to process, branch 732 is taken, otherwise branch 731 is taken.

In step 735, the parent object in the current relationship instance being processed is ranked and its score in the parent object hit-list is updated. The parent Object Hit-list 350' being created by the current iteration of 635 is updated for the current entry 455a. The From Id 460a for the current entry 455a is used to identify the appropriate entry 355'a to update by looking up 460a in the Object Id column 370'. If an entry 355'a does not exist with Object Id 370' equal to 460a, one is created. The Score 365'a for entry 355'a is updated by applying formula F, which takes as input the current Score 355'a, the Weight 470a of the current relationship instance 455a, and the child object's Score 355a (from the child Object Hit-list 350). The Children Table 580 for entry 355'a is obtained by following the pointer in field 380'. If entry 355'a is newly created, a new Children Table 580 is created. The Number 360a for entry 355a is added to Children Table 580 by adding a new entry 590 with its Child Number 585 set to Number 360a, its Object Hit-list pointer 595 set to point to Object Hit-list 350, and its Relation 575 set to 425 (for the relationship currently being processed).

In a preferred embodiment, a parent object's structural relevance score is computed by summing the weighted rank scores of its children objects, where children objects are those objects in the set identified in step 705 to which the parent object is related, as determined by Relationship Table 450. A child's weighted rank score is its score in field 365a multiplied by the relationship weight 470a. To produce this end result, formula F multiplies Score 365a by Weight 470a and adds that value to 365'a. Note that when a new entry 355'a is created, the Score field 365'a is initialized to 0.

Figure 12B:
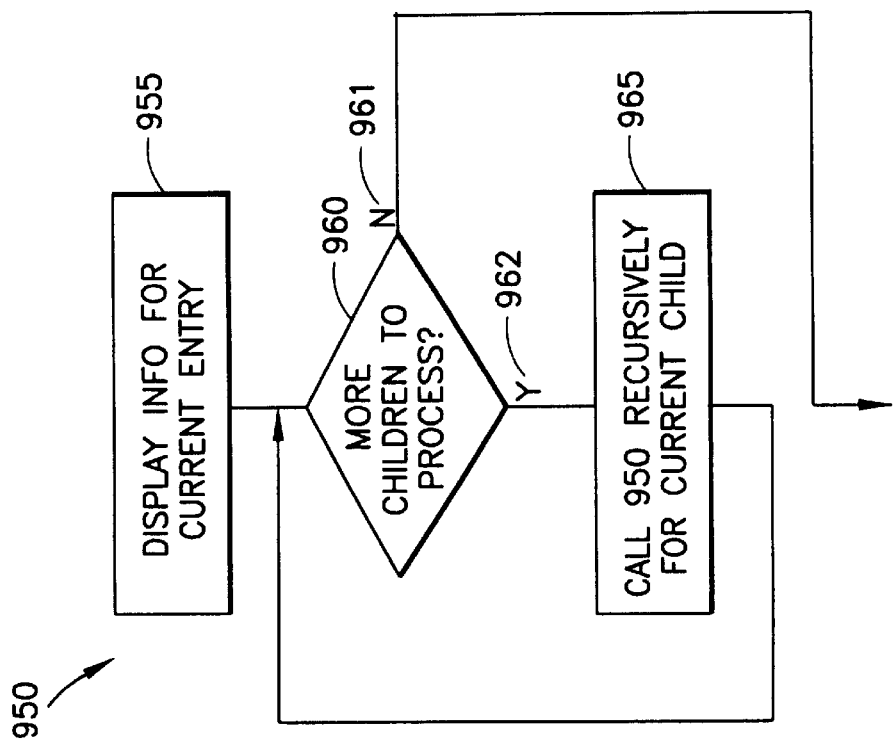
FIGS. 12A and 12B, are flow charts showing the steps of a preferred process for displaying the results in a ranked hierarchical order.
Figure 12A:
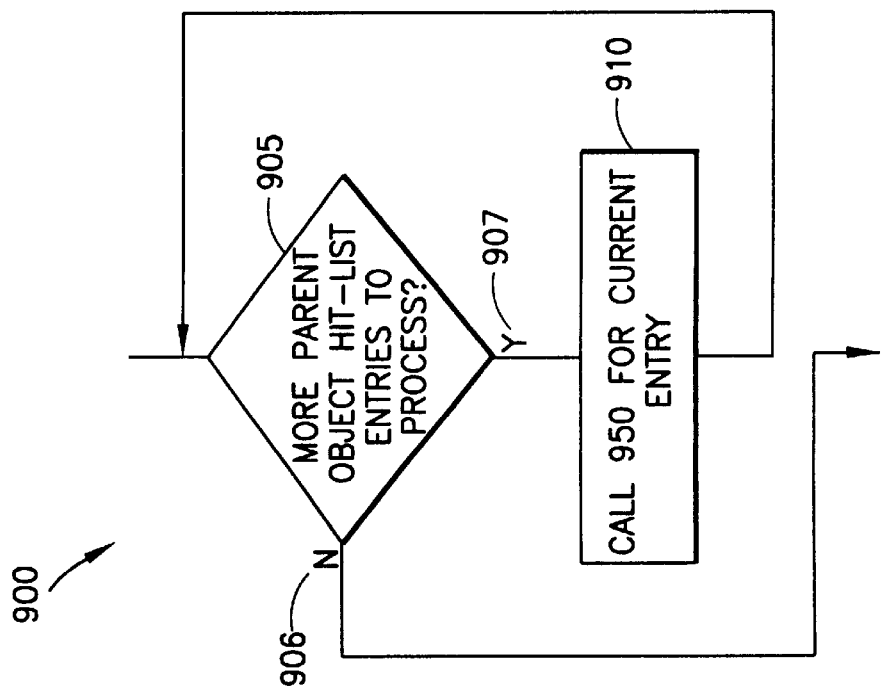

After all selected child objects have been processed in 711, the parent Object Hit-list 350' will have been updated for the current relationship. The algorithm then returns to step 630 in FIG. 10. FIG. 12 consists of FIGS. 12A and 12B. FIG. 12A shows the steps for process 900 in detail. A hierarchical result display is created by processing the most recently created parent Object Hit-list 350'. In step 905 an iteration over each of the entries 355' in parent Object Hit-list 350' is performed, where each entry is processed as follows in turn by following path 907. When all entries have been processed, path 906 is followed.

In step 910, process 950 (described in detail in FIG. 12B) is called for the current entry.

FIG. 12B shows the steps for process 950 in detail. Process 950 operates on an entry 355 from an Object Hit-list 350. In step 955, the current entry 355 is displayed by indenting and printing various attributes (obtained from the Object Catalog 210) for the object identified by the current entry. If the Children field 380 for the current entry 355 is not empty, then an iteration over the children identified by the Children Table 580 pointed to by field 380a is performed in step 960. At each level of the hierarchy, the relationships used for displaying children may be specified. If relationships have been specified for this level, they are used to filter the children that will be displayed by requiring that a child's Relation 575 match one of the specified relationships. Each matching child is processed as follows in turn by following path 962. The current entry being processed will be referred to as 590a. If there are no more children to process, path 961 is followed.

In step 965, the Child Number 585a for the current Children Table entry 590a is used to identify the child's corresponding hit-list entry 355 by indexing into the Number field 360 of the Object Hit-list 350 identified in Object Hit-list identifier field 595a of entry 590a. This hit-list entry 355 is then processed by calling process 950 recursively for that entry.

Figure 13:
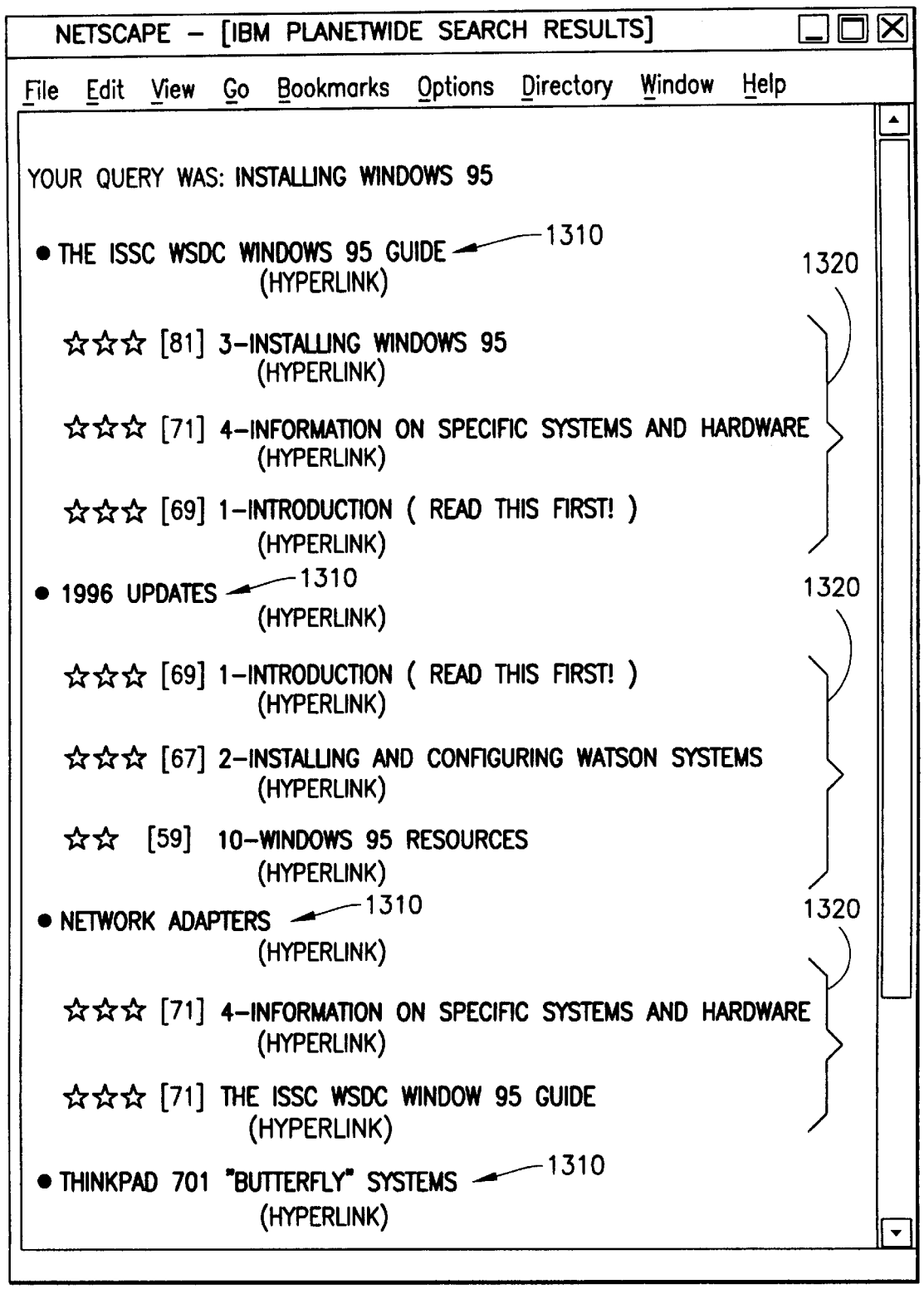
FIG. 13 is a screen dump showing a sample output result of the present invention.

The result of step 900 is a display of ranked hierarchies where children are shown grouped and indented under their parent. An example of such a display is shown in FIG. 13. FIG. 13 shows a sample output result of the system. The Figure shows the result of iterating step 635 once, such that a two level hierarchy is generated. The original topically relevant objects supplied in step 610 are displayed indented as 1320. The structurally relevant parent objects found after one iteration of step 635 are displayed non-indented as 1310. The parent objects 1310 form the next level of the hierarchical view, provide navigational starting points for browsing the relevant objects, and group the topically relevant child objects 1320. The display provides the end user with insight into the structure of the object collection being searched. Attributes for each of the objects shown in the display are obtained from the Object Catalog 210 and Attribute Tables 250.

Given this disclosure alternative equivalent embodiments will become apparent to those skilled in the art. These embodiments are also within the contemplation of the inventors.

We claim:

1. A computer system having one or more memories and one or more central processing units, the computer capable of accessing one or more database memories, a plurality of objects stored in one or more of the database memories and each object identified by an index, the computer system further comprising:

a user interface for entering a query;

a hit list, stored in one or more of the memories, the hit list being a topically relevant set of a plurality of topically relevant objects, the topically relevant set being selected from one or more of the database memories and ranked by a topical search engine using the index, the rank indicating a topical relevance to the query;

a relationship data structure containing information about how two or more of the objects are related to one another by one or more structural relationships, the structural relationships being directed; and a hierarchical view generator that selects a structurally relevant set of the objects, each object in the structurally relevant set being a candidate parent of one or more of the topically relevant objects according to one or more of the structural relationships, said hierarchical view generator dynamically determining which of the candidates for parents are selected as actual parents for said query entered by said user interface, based on said one or more structural relationships, each of the topically relevant objects being a child of one or more of the selected parents, the hierarchical view generator organizing each of the child objects under one or more of its respective selected parents to create a directional hierarchy.

2. A computer system, as in claim 1, further comprising a display that renders a presentation of one or more of the selected parents and the child objects associated with the respective selected parent.

3. A computer system, as in claim 1, where the database memory resides on one or more connected computers that are connected to the computer system by a network.

4. A computer system, as in claim 3, where the query accesses the computer system from the network.

5. A computer system, as in claim 1, where the hierarchical view generator subselects a subset of the most relevant topically relevant objects according to rank as the topically relevant set.

6. A computer system, as in claim 1, where the information in the relationship data structure includes weights for the structural relationships and the hierarchical view generator subselects a subset of the structurally relevant objects as the structurally relevant set as a function of the weights.

7. A computer system, as in claim 1, where one or more relationship data structures defining one or more structural relationships are selected using information in the query.

8. A computer system, as in claim 1, where the structural relationships include any one or more of the following: the hyperlink relationship, the subclass or categorization relationship, the geographic location relationship, the location within a file system relationship, the conceptual relationship, and the is-a-part-of relationship.

9. The system of claim 1, wherein said hit-list is organized into a hierarchical structure of parent and children objects,
the connections in the structure corresponding to one or more of the structural relationships, and said structured hit-list allowing a user to understand a nature of the results of the query, and to find an appropriate object to satisfy the user's information need.

10. The system of claim 1, wherein a topical search, responsive to the query, comprises a content-based similarity search where the query does not define a precise set of objects,
the search engine computing the similarity of the query to each object in the database to generate a ranked list of objects ordered by relevance to the query.

11. The system of claim 1, wherein said objects comprise data objects, and said data objects are stored in a database with relationships defined between the objects,
said hierarchical view generator selecting and processing the relationships to identify structurally relevant parents from an original child set.

12. The system of claim 1, wherein said hierarchical view generator includes an iterator, said iterator processing structural relationships to build a parent hierarchy based on topical and structural relevance,
said iterator selecting structural relationships in a query context and ranks parent objects based on their structural relevance to the query.

13. The system of claim 1, wherein the hierarchical structure groups objects for answering a user's query, and provides insight into the relevant structure of the database, to satisfy the user's information need.

14. The system of claim 1, wherein the user's query selects certain relationships for finding structurally relevant objects and for organizing and displaying the result list accordingly,
wherein said objects are ranked based on degrees of topical relevance, and a subset of the topically relevant objects is selected for further relationship processing.

15. The system of claim 1, wherein said objects on the result list are organized based on their structural relationships, and display of objects at certain levels of the hierarchy is suppressed based on the relationships in which they participate,
wherein objects in the topically relevant set are ranked, and the children thereof are organized under their parents according to a structural relationship.

16. A computer system having one or more memories and one or more central processing units, the computer capable of accessing one or more database memories, a plurality of objects stored in one or more of the database memories and identified by an index, the computer system further comprising:
a user interface for entering a query;
a hit list, stored in one or more of the memories, the hit list being a topically relevant set of a plurality of topically relevant objects, the topically relevant set being selected from one or more of the database memories and ranked by a topical search engine using the index, the rank indicating a topical relevance to the query,
a relationship data structure containing information about how two or more of the objects are related to one another by one or more structural relationships, the structural relationships being directed;
a hierarchical view generator that selects a structurally relevant set of the objects, each object in the structurally relevant set being a candidate parent of one or more of the topically relevant objects according to one or more of the structural relationships, said hierarchical view generator dynamically determining which of the candidates for parents are selected as actual parents for said query entered by said user interface, based on said one or more structural relationships,
each of the topically relevant objects being a child of one or more of the selected parents, the hierarchical view generator organizing each of the child objects under one or more of its respective selected parents to create a directional hierarchy; and
an iterator in the hierarchical view generator that treats the selected parents as topically relevant objects and runs the hierarchical view generator zero or more times, each time creating a parent level in the directional hierarchy.

17. A system, as in claim 16, where a different set of one or more structural relationships is selected in one or more iterations of the iterator.

18. A computer system, as in claim 16, further comprising:
a display that renders a presentation of one or more selected parents in one of the parent levels and one or more of the objects, being displayed objects, structurally related to one of the selected parents and at a lower level than the parent level in the directional hierarchy.

19. A system, as in claim 18, where one or more of the displayed objects is suppressed in the display.

20. A system, as in claim 19, where the displayed object is suppressed due to its structural relationship with the respective selected parent.

21. A computer system having one or more memories and one or more central processing units, the computer capable of accessing one or more database memories, a plurality of objects stored in one or more of the database memories and each object identified by an index, the computer system further comprising:
means for selecting a topically relevant set of two or more of the objects;

means for ranking the objects in the topically relevant set;

means for identifying one or more structural relationships between one or more of the objects in the topically relevant set, being children, and one or more of the objects in the database memories, being parents, the structural relationships being directional from the parent to the child, said identifying means including means for dynamically determining which of the candidates for parents are selected as actual parents for said query entered by said user interface based on said one or more structural relationships; and means for organizing one or more of the children under each of the respective selected parents in a structural hierarchy.

22. A method of hierarchically grouping a plurality of objects stored In one or more database memories of a computer system, comprising steps of:

a. selecting a topically relevant set of two or more of the objects;

b. ranking the objects in the topically relevant set;

c. identifying one or more structural relationships between one or more of the objects in the topically relevant set, being children, and one or more of the objects in the database memories, being parents, the structural relationships being directional from the parent to the child, said step of dynamically determining which of the candidates for parents are selected as actual parents for said query entered by said user interface based on said one or more structural relationships; and d. organizing one or more of the children under each of the respective selected parents.

23. A method, as in claim 22, further comprising steps of:

e. deselecting the children and identifying the parents as children; and f. repeating steps c and d zero or more times, each time creating a next hierarchical level.

\* \* \* \* \*